United States Patent
Karnjate et al.

(10) Patent No.: US 8,364,367 B2
(45) Date of Patent: Jan. 29, 2013

(54) BRAKE ASSIST EXIT METHOD AND SYSTEM FOR VEHICLES

(75) Inventors: Timothy M. Karnjate, Grand Blanc, MI (US); William K. Manosh, Lancaster, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1340 days.

(21) Appl. No.: 11/872,730

(22) Filed: Oct. 16, 2007

(65) Prior Publication Data

US 2009/0099744 A1 Apr. 16, 2009

(51) Int. Cl.
- *G06F 7/00* (2006.01)
- *G06F 19/00* (2006.01)
- *G06F 17/00* (2006.01)
- *G06G 7/00* (2006.01)
- *G06G 7/76* (2006.01)
- *B60T 7/12* (2006.01)
- *B60T 8/32* (2006.01)
- *G05D 1/00* (2006.01)

(52) U.S. Cl. .............................. 701/70; 701/78; 701/83
(58) Field of Classification Search .................. 701/70, 701/78, 83
See application file for complete search history.

(56) References Cited

U.S. PATENT DOCUMENTS

| | | | |
|---|---|---|---|
| 5,230,549 A | 7/1993 | Osada et al. | |
| 5,779,329 A | 7/1998 | Takeshima | |
| 5,816,667 A | 10/1998 | Jokic | |
| 5,853,230 A | 12/1998 | Wagner et al. | |
| 5,931,545 A | 8/1999 | Yonemura et al. | |
| 5,962,997 A * | 10/1999 | Maisch | 188/162 |
| 5,967,628 A | 10/1999 | Abe et al. | |
| 6,021,365 A | 2/2000 | Ishii et al. | |
| 6,024,420 A | 2/2000 | Yonemura et al. | |
| 6,099,086 A | 8/2000 | Feigel et al. | |

(Continued)

FOREIGN PATENT DOCUMENTS

| | | |
|---|---|---|
| DE | 19712859 A1 | 10/1998 |
| DE | 10124591 A1 | 1/2002 |

(Continued)

OTHER PUBLICATIONS

Office Action issued on Mar. 4, 2010, for German Patent Application No. 102008051452.

(Continued)

*Primary Examiner* — Thomas Tarcza
*Assistant Examiner* — Imran Mustafa
(74) *Attorney, Agent, or Firm* — Ingrassia Fisher & Lorenz, P.C.

(57) ABSTRACT

A method for providing a smooth exit from a panic braking assist algorithm, in a vehicle having a braking system with a brake pedal, comprises the steps of measuring a force applied to the brake pedal, measuring a movement of the brake pedal, applying a first level of braking when the force applied to the brake pedal is equal to a predetermined force calibration value, applying a second level of braking when the movement of the brake pedal is equal to a predetermined travel calibration value, and applying a variable level of braking when the force applied to the brake pedal is less than the predetermined force calibration value and the movement of the brake pedal is greater than the predetermined travel calibration value. The variable level of braking is a function of the movement of the brake pedal.

20 Claims, 3 Drawing Sheets

U.S. PATENT DOCUMENTS

| | | | |
|---|---|---|---|
| 6,105,737 A * | 8/2000 | Weigert et al. | 188/158 |
| 6,109,703 A | 8/2000 | Takahashi | |
| 6,142,581 A | 11/2000 | Yamaguchi et al. | |
| 6,212,459 B1 | 4/2001 | Unterforsthuber | |
| 6,386,646 B1 | 5/2002 | Hinz et al. | |
| 6,457,785 B1 | 10/2002 | Yonemura et al. | |
| 6,473,681 B1 | 10/2002 | Eckert et al. | |
| 6,474,751 B1 | 11/2002 | Yamaguchi et al. | |
| 6,476,515 B1 | 11/2002 | Yamamoto et al. | |
| 6,637,839 B1 * | 10/2003 | Fuchs et al. | 303/191 |
| 7,117,072 B2 | 10/2006 | Gehring et al. | |
| 7,630,807 B2 | 12/2009 | Yoshimura et al. | |
| 7,634,345 B2 | 12/2009 | Karnjate et al. | |
| 7,826,952 B2 | 11/2010 | Disser et al. | |
| 2001/0005805 A1 | 6/2001 | Saotome et al. | |
| 2002/0163247 A1 | 11/2002 | Yonemura et al. | |
| 2003/0031578 A1 | 2/2003 | Uchiyama et al. | |
| 2005/0046272 A1* | 3/2005 | Rieth et al. | 303/113.4 |
| 2006/0220826 A1 | 10/2006 | Rast | |
| 2006/0287797 A1 | 12/2006 | Haller et al. | |
| 2008/0234907 A1 | 9/2008 | Labuhn et al. | |
| 2009/0082935 A1 | 3/2009 | Leschuk et al. | |
| 2009/0099745 A1 | 4/2009 | Karnjate et al. | |
| 2009/0105919 A1 | 4/2009 | Karnjate et al. | |
| 2010/0030421 A1 | 2/2010 | Yoshimura et al. | |

FOREIGN PATENT DOCUMENTS

| | | |
|---|---|---|
| DE | 10118635 A1 | 5/2002 |
| DE | 102005021497 A1 | 11/2006 |
| DE | 102006013051 A1 | 9/2010 |
| WO | 0010852 A1 | 3/2000 |
| WO | 03022648 A1 | 3/2003 |
| WO | 2004085220 A1 | 10/2004 |

OTHER PUBLICATIONS

Office Action issued on Feb. 25, 2010, for German Patent Application No. 102008051451, filed Oct. 13, 2008.

Office Action issued on May 11, 2010, for German Patent Application No. 102008051535.

Office Action dated Jun. 23, 2010, issued in U.S. Appl. No. 11/872,733.

Response dated Sep. 22, 2010, for U.S. Appl. No. 11/872,733.

Office Action mailed Dec. 9, 2010, issued in U.S. Appl. No. 11/872,733.

U.S. Office Action for Utility U.S. Appl. No. 11/873,450 mailed Jan. 5, 2011.

U.S. Final Office Action for U.S. Appl. No. 11/873,450 mailed Apr. 18, 2011.

U.S. Office Action for U.S. Appl. No. 11/872,733 mailed May 25, 2011.

* cited by examiner

US 8,364,367 B2

BRAKE ASSIST EXIT METHOD AND SYSTEM FOR VEHICLES

TECHNICAL FIELD

The present invention generally relates to the field of braking systems for vehicles and, more specifically, to a method and system for providing an exit from a brake assist algorithm.

BACKGROUND OF THE INVENTION

To enhance a driver's driving experience and a vehicle's performance and safety, various types of electronic enhancements and systems assist or replicate automotive systems that were previously mechanical in nature. One such automotive system is the brake-by-wire system. In a brake-by-wire system, a driver's activation of the brake pedal is determined by one or more sensors. Data from the sensors is then used by a computer or processor to determine an appropriate braking force to apply to the brakes based on the driver's intent as measured by the sensors.

Several different types of brake-by-wire systems exist. For example, in an electro-hydraulic braking system, the computer commands an electro-hydraulic actuator to apply hydraulic pressure to the brake calipers to stop the vehicle. In contrast, in an electro-mechanical braking system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electro-mechanical or electro-hydraulic, and regenerative braking, which is also a type of electronic braking in which speed is reduced by converting kinetic energy into electrical energy.

Regardless of the particular type of braking system, an important feature of many braking systems is the ability to provide appropriate braking assistance during a panic braking situation. In a panic braking situation, the vehicle driver typically applies force to the brake pedal at a very rapid rate, but not necessarily with a large enough force to decelerate the vehicle fast enough, based on the force alone. The braking system provides appropriate braking levels, for example, through a panic braking assist algorithm.

It is desirable for a panic braking command algorithm and system to provide a smooth exit from a panic braking assist algorithm. It is also desirable for a panic braking command algorithm and system to provide the driver of the vehicle with a level of control while exiting the panic braking assist algorithm, and/or to allow the driver to quickly and easily cause re-entry into the panic braking assist algorithm if needed.

Accordingly, it is desired to provide an improved method and system for providing a smooth exit from a panic braking assist algorithm. It is also desirable to provide a method and system for providing a smooth exit from a panic braking assist algorithm that provides the driver of the vehicle with greater control while exiting from the panic braking assist algorithm. In addition, it is desirable to provide a method and system for providing a smooth exit from a panic braking assist algorithm that allows the driver to quickly and easily cause re-entry into the panic braking assist algorithm. Furthermore, the desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method is provided for providing a smooth exit from a panic braking assist algorithm in a vehicle having a braking system with a brake pedal. The method comprises the steps of measuring a force applied to the brake pedal, measuring a movement of the brake pedal, applying a first level of braking when the force applied to the brake pedal is equal to a predetermined force calibration value, applying a second level of braking when the movement of the brake pedal is equal to a predetermined travel calibration value, and applying a variable level of braking when the force applied to the brake pedal is less than the predetermined force calibration value and the movement of the brake pedal is greater than the predetermined travel calibration value. The variable level of braking is a function of the movement of the brake pedal.

In accordance with another exemplary embodiment of the present invention, a control system for providing a smooth exit from a panic braking assist algorithm in a vehicle having a braking system with a brake pedal is provided. The control system comprises a first sensor, a second sensor, and a processor. The first sensor is configured to measure a force applied to the brake pedal. The second sensor is configured to measure a movement of the brake pedal. The processor is configured to at least facilitate application of a first level of braking when the force applied to the brake pedal is equal to a predetermined force calibration value, application of a second level of braking when the movement of the brake pedal is equal to a predetermined travel calibration value, and application of a variable level of braking when the force applied to the brake pedal is less than the predetermined force calibration value and the movement of the brake pedal is greater than the predetermined travel calibration value. The variable level of braking is a function of the movement of the brake pedal.

In accordance with a further exemplary embodiment of the present invention, a braking system for a vehicle is provided. The braking system comprises a brake pedal, a brake pedal force sensor, a brake pedal travel sensor, a plurality of brake units, and a brake controller. The brake pedal force sensor is configured to measure a force applied to the brake pedal. The brake pedal travel sensor is configured to measure a movement of the brake pedal. The plurality of brake units are configured to slow or stop the vehicle. The brake controller is configured to at least facilitate application of the plurality of brake units with a first level of braking when the force applied to the brake pedal is equal to a predetermined force calibration value, application of the plurality of brake units with a second level of braking when the movement of the brake pedal is equal to a predetermined travel calibration value, and application of the plurality of brake units with a variable level of braking when the force applied to the brake pedal is less than the predetermined force calibration value and the movement of the brake pedal is greater than the predetermined travel calibration value. The variable level of braking is a function of the movement of the brake pedal.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
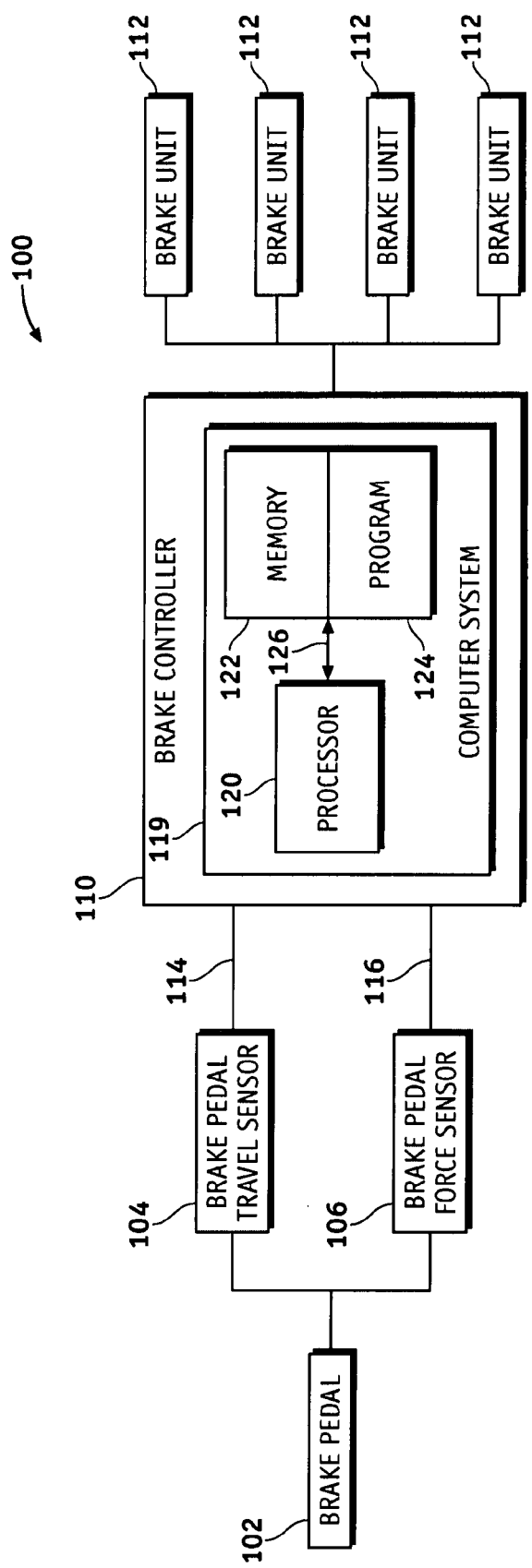
FIG. 1 is a block diagram of a vehicle braking system that can be used in exiting from a panic braking assist algorithm in accordance with an exemplary embodiment of the present invention.

FIG. 1 is a block diagram of an exemplary braking system 100 for use in a brake-by-wire system. The braking system 100 includes a brake pedal 102, a brake pedal travel sensor 104, a brake pedal force sensor 106, a brake controller 110, and a plurality of brake units 112. The brake pedal 102 provides an interface between a driver of a vehicle and a brake system or a portion thereof, such as the braking system 100, which is used to slow or stop the vehicle. To initiate the braking system 100, a driver would typically use his or her foot to apply a force to the brake pedal 102 to move the brake pedal 102 in a generally downward direction. In one preferred embodiment the braking system 100 is an electro-hydraulic system.

The brake pedal travel sensor 104 and the brake pedal force sensor 106 are coupled to the brake pedal 102. The brake pedal travel sensor 104 provides an indication of how far the brake pedal 102 has traveled, which is also known as brake pedal travel, when the driver applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 104 collects brake pedal travel data for ultimate use by the brake controller 110.

The brake pedal force sensor 106 determines how much force the driver of braking system 100 is applying to the brake pedal 102. This is also known as the brake force applied by the driver. In one exemplary embodiment, the brake pedal force sensor 106 may include a hydraulic pressure emulator and/or a pressure transducer, and the brake force can be determined by measuring hydraulic pressure in a master cylinder of the braking system 100. Other methods of determining the amount of brake force can also be used. Regardless of the particular method utilized, the brake pedal force sensor 106 collects brake pedal force data for ultimate use by the brake controller 110 in implementing an exit strategy from panic assist braking.

The brake controller 110 is coupled to the brake pedal travel sensor 104 and the brake pedal force sensor 106, as well as to the brake units 112. The brake controller 110 receives a first input 114 from the brake pedal travel sensor 104, namely brake pedal travel data, and a second input 116 from the brake pedal force sensor 106, namely brake pedal force data. As described in more detail below, the brake controller 110 uses values from the first and second inputs 114, 116, to perform various calculations, comparisons, and determinations, such as those discussed further below in connection with FIG. 2. The brake controller 110 uses such calculations, comparisons, and determinations in determining when, and how, to exit from a panic braking assist algorithm during a panic braking event, by controlling the brake units 112 accordingly with appropriate brake commands based on the determinations.

In the depicted embodiment, the brake controller 110 includes a computer system 119 that includes a processor 120, a memory 122, and a bus 126. The processor 120 performs the computation and control functions of the brake controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 124 contained within the memory 122 and, as such, controls the general operation of the computer system 119. The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 126 serves to transmit programs, data, status and other information or signals between the various components of the computer system 119. The bus 126 can be any suitable physical or logical means of connecting computer systems and components. This includes, but is not limited to, direct hard-wired connections, fiber optics, infrared and wireless bus technologies. During operation, the program 124 is stored in the memory 122 and executed by the processor 120. It will be appreciated that the brake controller 110 may differ from the embodiment depicted in FIG. 1, for example in that the brake controller 110 may be coupled to or may otherwise utilize one or more remote computer systems and/or other control systems.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electro-mechanical brake-by-wire system, the brake units 112 can comprise a wheel torque-generating device that operates as a vehicle brake. The brake units 112 can also be regenerative braking devices, in which case the brake units 112, when applied, at least facilitate conversion of kinetic energy into electrical energy.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electro-mechanical brake-by-wire system, the brake units 112 can comprise a wheel torque-generating device that operates as a vehicle brake. The brake units 112 can also be regenerative braking devices.

Figure 2:
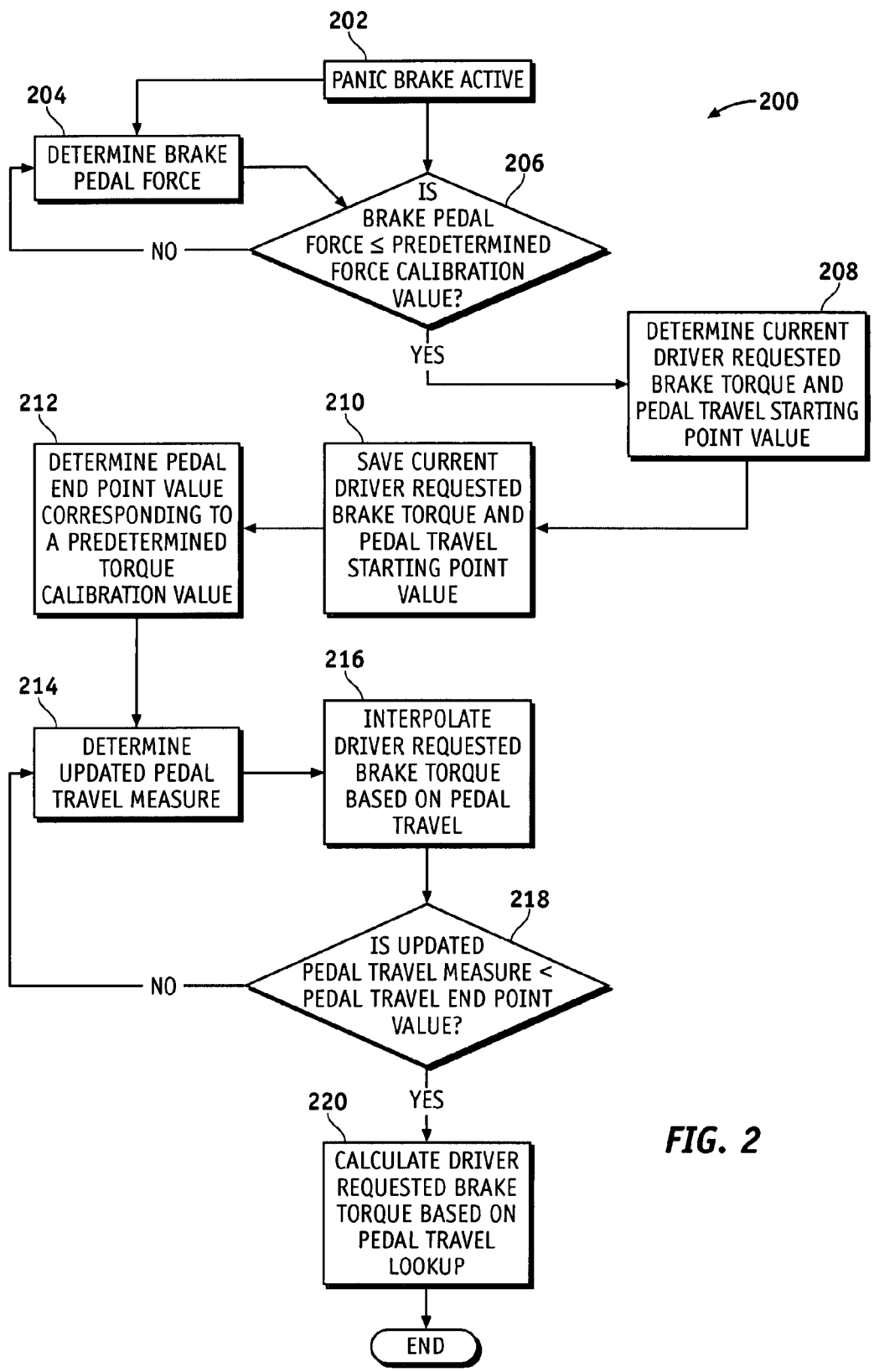
FIG. 2 is a flowchart illustrating a process for exiting from a panic braking assist algorithm in accordance with an exemplary embodiment of the present invention.

FIG. 2 is a flowchart illustrating an exemplary embodiment of a process 200 for providing a smooth exit from a panic braking assist algorithm. The process 200 commences when a vehicle is already experiencing a panic braking event and an appropriate level of braking is already being implemented by the panic braking assist algorithm, denoted as step 202 in FIG. 2. For example, in step 202, an increased level of braking may be applied, in accordance with a non-depicted panic braking control algorithm.

In step 204, an amount of brake pedal force is measured, based on brake pedal force data. In one embodiment, the brake pedal force data is obtained via the second input 116 from the brake pedal force sensor 106 of FIG. 1, and represents a measured amount of force applied by the driver against the brake pedal 102 of FIG. 1. This measurement, as well as the various other measurements, calculations, comparisons, and determinations referenced herein, are preferably conducted by the brake controller 110, and most preferably by a processor 120 therein or used in connection therewith, such as that described above in connection with FIG. 1.

Next, in step 206, a determination is made as to whether the amount of brake pedal force is less than or equal to a predetermined force calibration value. In a preferred embodiment, the predetermined force calibration value represents a known amount of brake pedal force that typically signals an end, or a near end, of a panic braking event. The predetermined force calibration value can be ascertained via historical data, prior experiments, literature in the field, vehicle manuals, and/or various other sources. The predetermined force calibration value will vary based on different factors, such as the type of vehicle, the type of braking system, and performance requirements pertaining thereto. Step 206 is preferably repeated throughout the process 200 until the exit from the panic braking assist algorithm is complete, as described further below.

If it is determined in step 206 that the amount of brake pedal force is less than or equal to the predetermined force calibration value, then the process proceeds to step 208, and the exit from the panic braking assist algorithm begins. Conversely, if it is determined in step 206 that the amount of brake pedal force is greater than the predetermined force calibration value, then the process instead returns to step 204, and the amount of brake pedal force is re-calculated using updated brake pedal force data. Step 204 repeats in this manner, preferably continuously, until a determination is made in step 206 that the amount of brake pedal force is less than or equal to the predetermined force calibration value, at which point the process proceeds to step 208. However, as step 206 is continuously repeated throughout the process 200, if the brake pedal force is subsequently determined at any point to be greater than the predetermined force calibration value (e.g. if the driver re-applies a sufficient amount of force to the brake pedal to re-start a panic braking event after step 208 has begun), then the process 200 returns again to step 204, and the panic braking assist algorithm is re-implemented until a further determination is made in a subsequent iteration of step 206 that the brake pedal force is less than or equal to the predetermined force calibration value. During step 204, the braking for the vehicle continues to be applied at a level determined by the panic braking assist algorithm.

In step 208, the exit from the panic braking assist algorithm begins, and a first measure of driver-requested braking torque and a pedal travel starting point value are determined. The driver-requested braking torque represents an estimate of an amount of braking torque desired by the driver at a particular point in time based on the driver's application of the brake pedal. During step 208, the first measure of driver-requested braking torque is preferably set equal to an amount of braking torque corresponding with the above-described predetermined force calibration value, for example as determined via a braking torque-to-brake pedal force look-up table using the predetermined force calibration value as an input. The pedal travel starting point value is determined at a point in time when the brake pedal force is equal to the predetermined force calibration value. The pedal travel starting point is preferably based on brake pedal travel data, such as the first input 114 from the brake pedal travel sensor 104 of FIG. 1, representing a measured travel distance, or how far the brake pedal 102 of FIG. 1 has traveled as a result of the force applied to the brake pedal 102 by the driver of the vehicle. Braking is applied in accordance with the first measure of driver-requested braking torque during step 208.

The first measure of driver-requested braking torque and the pedal travel starting point value are then stored in step 210 for future reference. In one embodiment, these values are stored in the brake controller 110, preferably in memory 122 in the computer system 119 therein as shown in FIG. 1. Braking continues to be applied in accordance with the first measure of driver-requested braking torque, or as otherwise provided in the panic braking assist algorithm, during step 210.

Next, in step 212, a pedal travel end point value is determined. The pedal travel end point value reflects a pedal travel amount that corresponds with a predetermined torque calibration value. In a preferred embodiment, the predetermined torque calibration value represents a known amount of braking torque signaling a completed exit from a panic braking assist algorithm, and the pedal travel end point value is determined via a braking torque-to-brake pedal travel look-up table using the predetermined torque calibration value as an input. Similar to the predetermined force calibration value, the predetermined torque calibration value can be ascertained via historical data, prior experiments, literature in the field, vehicle manuals, and/or via various other sources, and may vary based on different factors, such as the type of vehicle, the type of braking system, and performance requirements pertaining thereto. In various embodiments the predetermined torque calibration value and the pedal travel end point value may be determined prior to, or at any time during, the commencement of the process 200.

Meanwhile, in step 214, an updated pedal travel measure is obtained from updated pedal travel data, such as from the first input 114 from the brake pedal travel sensor 104 of FIG. 1. Step 214 preferably is thereafter performed continuously at least throughout the remainder of the process, so that the updated pedal travel measure reflects current movement of the brake pedal at any particular point in time. Steps 212 and 214, along with various other steps of the process 200, may be conducted simultaneously or in either order.

Next, in step 216, a current measure of driver-requested braking torque is determined, based on the most recent value of the updated pedal travel measure from step 214 and a linear interpolation between the pedal travel starting point value and the pedal travel end point value. For example, the current measure of driver-requested braking torque may be determined by first (i) determining the relative proximity of the updated pedal travel measure to the pedal travel starting point value versus the pedal travel end point value, and (ii) setting the current measure of driver-requested braking torque to be an amount between the first measure of driver-requested braking torque and the predetermined torque calibration value, based on the relative proximity. Accordingly, the relative proximity of the current measure of driver-requested braking torque to the first measure of driver-requested braking torque is directly related to the relative proximity of the updated pedal travel measure to the pedal travel starting point value, while the relative proximity of the current measure of driver-requested braking torque to the predetermined torque calibration value is directly related to the relative proximity of the updated pedal travel measure to the pedal travel end point value. Braking is applied with the current measure of driver-requested braking torque during step 216.

Next, in step 218, a determination is made as to whether the updated pedal travel measure is less than the pedal travel end point value. If it is determined in step 218 that the updated pedal travel measure is less than the pedal travel end point value, then the exit from the panic braking assist algorithm is complete, and the process proceeds accordingly to step 220. In step 220, a new current measure of driver-requested braking torque is determined via a braking torque-to-brake pedal travel look-up table, using the updated pedal travel measure as an input, and braking is applied at a level equal to the new current measure of driver-requested braking torque.

Conversely, if it is determined in step 218 that the updated pedal travel measure is greater than or equal to the pedal travel end point value, then the exit from the panic braking assist algorithm continues, and the process returns accordingly to step 214, in which a new updated pedal travel measure is determined. Steps 214-218 repeat until the exit from the panic braking assist algorithm is complete, that is, until it is determined in step 218 that the updated pedal travel measure is less than the pedal travel end point value, at which point the process proceeds to step 220 as described above.

Thus, when the amount of brake pedal force is less than or equal to the predetermined force calibration value (step 206), braking is applied at the first level of driver-requested braking torque, as can be determined for example via a braking torque-to-brake pedal force look-up table, using the predetermined force calibration value as an input (step 208). Alternatively, the predetermined force calibration value can be determined via the braking torque-to-brake pedal force look-up table using the first level of driver-requested braking torque as an input. The exit from the panic braking assist algorithm begins at this point, and continues until it is determined that the updated pedal travel measure is less than the pedal travel end point value (step 218). In between, during the exit from the panic braking assist algorithm, braking is applied at a level determined by linear interpolation between the pedal travel starting point value and the pedal travel end point value, and accordingly between corresponding braking torque values between the first measure of driver-requested braking torque and the predetermined torque calibration value (step 216). After the exit from the panic braking assist algorithm is complete, braking is applied at a level determined via a braking torque-to-brake pedal travel look-up table, using the updated pedal travel measure as an input (step 220). Additionally, if at any time the driver re-applies an amount of force to the brake pedal that is greater than or equal to the predetermined force calibration value (as determined by the continuous performance of step 206), then the exit from the panic braking assist algorithm is suspended, and braking is once again determined by the panic braking assist algorithm.

Figure 3:
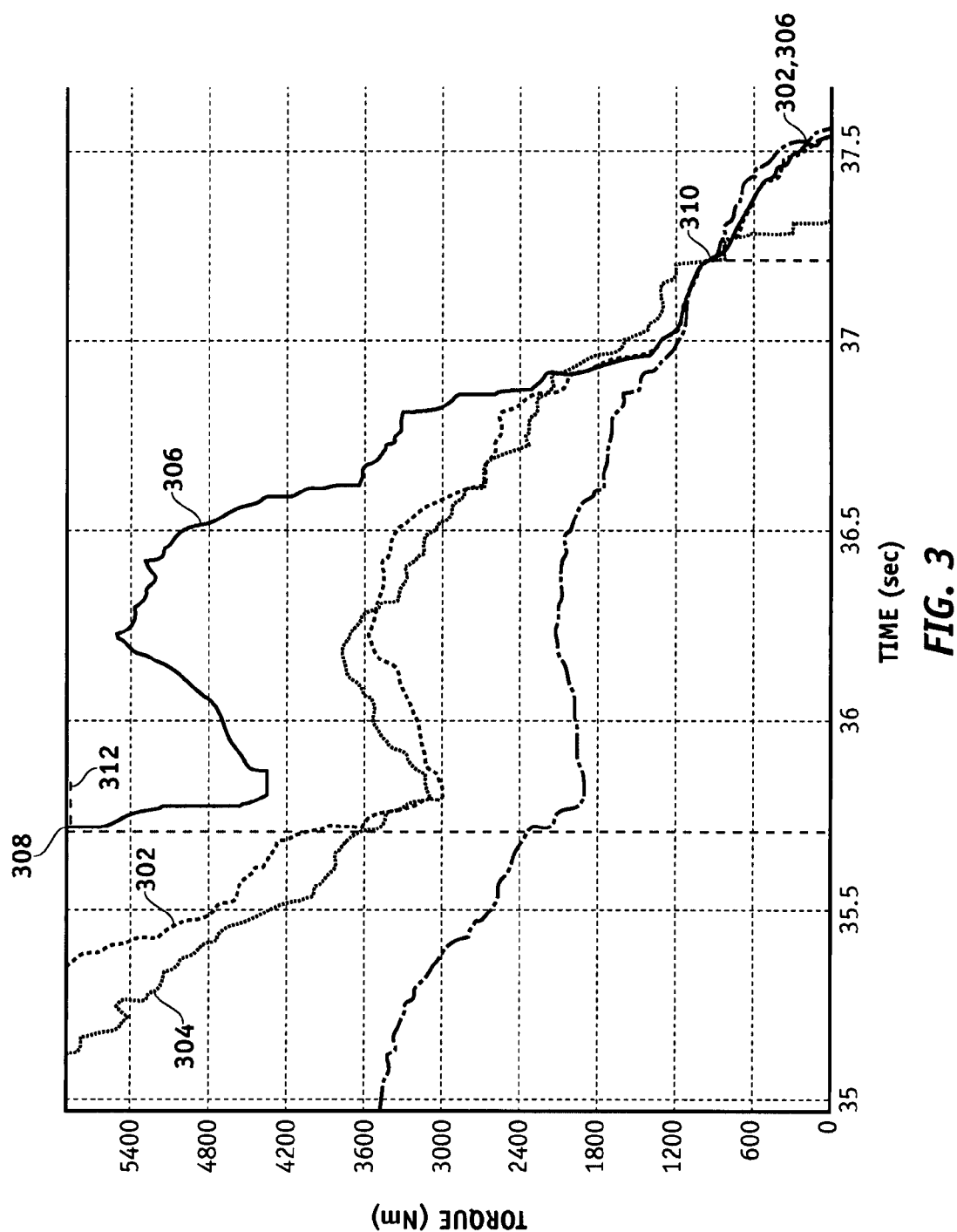
FIG. 3 is a graphical representation of an exemplary episode in which a driver of a vehicle has applied force to a brake pedal of the vehicle braking system of FIG. 1 and in which the process of FIG. 2 has been applied.

FIG. 3 is a graphical representation of an exemplary episode during a panic braking event in which a driver of a vehicle has applied force to the brake pedal 102 of the braking system 100 of FIG. 1 and in which the process 200 of FIG. 2 has been applied. Specifically, FIG. 3 includes a travel-based driver request curve 302 (based on brake travel data obtained by the brake pedal travel sensor 104 of FIG. 1, in a preferred embodiment), a force-based driver request curve 304 (based on brake force data obtained by the brake pedal force sensor 106 of FIG. 1, in a preferred embodiment), and a driver-requested braking torque curve 306 (representing the level of application of the brake units 112 of FIG. 1, as determined in the process 200 of FIG. 2), each depicting respective values during the exemplary episode. The x-axis represents time (measured in msec), and the y-axis represents torque (measured in Newton-meters).

FIG. 3 includes an initiation point 308 and an ending point 310 for the exit from the panic braking assist algorithm. The exit from the panic braking assist algorithm begins at the initiation point 308, which corresponds to the brake pedal force being equal to the predetermined force calibration value of the process 200 (corresponding to step 206 of FIG. 2). At the initiation point 308, a first measure of driver-requested braking torque 312 and a pedal travel starting point value (not depicted in FIG. 3) are determined, and the brake units 112 are applied with a level of braking corresponding to the first measure of driver-requested braking torque 312 (corresponding to step 208 of FIG. 2). A pedal travel end point value is also calculated (also not depicted in FIG. 3), reflecting a pedal travel amount that corresponds with the predetermined torque calibration value of FIG. 2 (also corresponding to step 208 of FIG. 2).

The exit from the panic braking assist algorithm is complete at the ending point 310, when pedal travel is equal to the pedal travel point end value. Between the initiation and ending points 308, 310, braking is applied at a variable level between the pedal travel starting point value and the pedal travel end point value, through linear interpolation using pedal travel data as an input (corresponding to step 220 of FIG. 2). Following the ending point 310, braking is applied at a level equal to the travel-based request, reflected in FIG. 3 by the travel-based driver request curve 302 being equal to the driver-requested braking torque curve 306 (corresponding to step 220 of FIG. 2).

The braking system 100 and the process 200 allow for a smooth exit from panic braking assist algorithms. The braking system 100 and the process 200 also provide the driver of the vehicle with greater control while exiting from a panic braking assist algorithm, for example because the level of braking applied is dependent upon the pedal travel of the brake pedal 102 at any particular point in time. Accordingly, the level of braking will increase or decrease as the driver causes the brake pedal 102 to move more quickly or slowly, respectively. In addition, the braking system 100 and the process 200 allow the driver to quickly and easily cause re-entry into the panic braking assist algorithm. Specifically, if the driver applies a sufficient force to the brake pedal 102, the exit from the panic braking assist algorithm is suspended, and braking is once again determined by the panic braking assist algorithm.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for providing a smooth exit from a panic braking assist algorithm in a vehicle having a braking system with a brake pedal, the method comprising the steps of:

measuring a force applied to the brake pedal;
measuring a movement of the brake pedal;

applying a first level of braking during a panic braking event when the force applied to the brake pedal is greater than a predetermined force calibration value;

determining a pedal travel starting point corresponding to the predetermined force calibration value;

determining a pedal travel ending point corresponding to a termination of the panic braking event; and applying a variable level of braking during an exit of the panic braking event based on a relative proximity of the movement of the brake pedal to the pedal travel starting point versus the pedal travel ending point, based on an interpolation between the pedal travel starting point and the pedal travel ending point, when the force applied to the brake pedal is less than the predetermined force calibration value and the movement of the brake pedal is greater than the pedal travel ending point.

2. The method of claim 1, further comprising the step of:
suspending the exit from the panic braking assist algorithm if the driver applies sufficient force to the brake pedal.

3. The method of claim 2, further comprising the step of:
determining the variable level of braking by linearly interpolating between the pedal travel starting point and the pedal travel ending point, to thereby linearly interpolate between corresponding braking torque values associated with the pedal travel starting point and the pedal travel ending point.

4. The method of claim 1, further comprising the step of:
determining the first level of braking from a first look-up table relating brake pedal force and desired levels of braking, at a point corresponding to the brake pedal force being at the predetermined force calibration value.

5. The method of claim 1, further comprising the step of:
determining the predetermined force calibration value from a first look-up table relating brake pedal force and desired levels of braking, at a point corresponding to the first level of braking.

6. The method of claim 1, wherein the first level of braking comprises a fixed level of braking while in the panic braking event, and the method further comprises:
applying braking torque in accordance with a driver intended braking torque based on a pedal travel look-up table if the movement of the brake pedal is less than the pedal travel ending point, wherein:
the variable level of braking during the exit from the panic braking event is relatively closer to the fixed level of braking as the brake pedal is relatively closer to the pedal travel starting point; and
the variable level of braking during the exit from the panic braking event is relatively closer to the driver intended braking torque based on the pedal travel look-up table as the brake pedal is relatively closer to the pedal travel ending point.

7. A control system for providing a smooth exit from a panic braking assist algorithm in a vehicle having a braking system with a brake pedal, the control system comprising:
a first sensor configured to measure a force applied to the brake pedal;
a second sensor configured to measure a movement of the brake pedal; and
a processor configured to at least facilitate:
application of a first level of braking during a panic braking event when the force applied to the brake pedal is greater than a predetermined force calibration value;
determining a pedal travel starting point corresponding to the predetermined force calibration value;
determining a pedal travel ending point corresponding to a termination of the panic braking event; and
application of a variable level of braking during an exit of the panic braking event based on a relative proximity of the movement of the brake pedal to the pedal travel starting point versus the pedal travel ending point, based on an interpolation between the pedal travel starting point and the pedal travel ending point, when the force applied to the brake pedal is less than the predetermined force calibration value and the movement of the brake pedal is greater than the pedal travel ending point.

8. The control system of claim 7, wherein the processor is further configured to at least facilitate:
suspending the exit from the panic braking assist algorithm if the driver applies sufficient force to the brake pedal.

9. The control system of claim 8, wherein the processor is further configured to determine the variable level of braking by linearly interpolating between the pedal travel starting point and the pedal travel ending point, to thereby linearly interpolate between corresponding braking torque values associated with the pedal travel starting point and the pedal travel ending point.

10. The control system of claim 7, wherein the processor is further configured to:
determine the first level of braking from a first look-up table relating brake pedal force and desired levels of braking, at a point corresponding to the brake pedal force being at the predetermined force calibration value.

11. The control system of claim 7, wherein the processor is further configured to:
determine the predetermined force calibration value from a look-up table relating brake pedal force and desired levels of braking, at a point corresponding to the first level of braking.

12. The control system of claim 7, wherein the first level of braking comprises a fixed level of braking while in the panic braking event, and the processor is further configured to at least facilitate applying braking torque in accordance with a driver intended braking torque based on a pedal travel look-up table if the movement of the brake pedal is less than the pedal travel ending point, wherein:
the variable level of braking during the exit from the panic braking event is relatively closer to the fixed level of braking as the brake pedal is relatively closer to the pedal travel starting point; and
the variable level of braking during the exit from the panic braking event is relatively closer to the driver intended braking torque based on the pedal travel look-up table as the brake pedal is relatively closer to the pedal travel ending point.

13. The control system of claim 7, further comprising:
a memory configured to store values of the force applied to the brake pedal and the movement of the brake pedal.

14. A braking system for a vehicle, comprising:
a brake pedal;
a brake pedal force sensor configured to measure a force applied to the brake pedal;
a brake pedal travel sensor configured to measure a movement of the brake pedal;
a plurality of brake units configured to slow or stop the vehicle; and
a brake controller configured to at least facilitate:
application of the plurality of brake units with a first level of braking during a panic braking event when the force applied to the brake pedal is greater than a predetermined force calibration value;

determining a pedal travel starting point corresponding to the predetermined force calibration value;

determining a pedal travel ending point corresponding to a termination of the panic braking event; and application of the plurality of brake units with a variable level of braking during an exit of the panic braking event based on a relative proximity of the movement of the brake pedal to the pedal travel starting point versus the pedal travel ending point, based on an interpolation between the pedal travel starting point and the pedal travel ending point, when the force applied to the brake pedal is less than the predetermined force calibration value and the movement of the brake pedal is greater than the pedal travel ending point.

15. The braking system of claim 14, wherein the brake controller is further configured to at least facilitate:

suspending the exit from the panic braking assist algorithm if the driver applies sufficient force to the brake pedal.

16. The braking system of claim 15, wherein the brake controller is further configured to determine the variable level of braking by linearly interpolating between the pedal travel starting point and the pedal travel ending point, to thereby linearly interpolate between corresponding braking torque values associated with the pedal travel starting point and the pedal travel ending point.

17. The braking system of claim 14, wherein the brake controller is further configured to:

determine the first level of braking from a look-up table relating brake pedal force and desired levels of braking, at a point corresponding to the brake pedal force being at the predetermined force calibration value.

18. The braking system of claim 14, wherein the brake controller is further configured to:

determine the predetermined force calibration value from a first look-up table relating brake pedal force and desired levels of braking, at a point corresponding to the first level of braking.

19. The braking system of claim 14, wherein the first level of braking comprises a fixed level of braking while in the panic braking event, and the brake controller is further configured to at least facilitate applying braking torque in accordance with a driver intended braking torque based on a pedal travel look-up table if the movement of the brake pedal is less than the pedal travel ending point, wherein:

the variable level of braking during the exit from the panic braking event is relatively closer to the fixed level of braking as the brake pedal is relatively closer to the pedal travel starting point; and the variable level of braking during the exit from the panic braking event is relatively closer to the driver intended braking torque based on the pedal travel look-up table as the brake pedal is relatively closer to the pedal travel ending point.

20. The braking system of claim 14, wherein the brake pedal force sensor comprises a hydraulic brake pedal emulator.

* * * * *